United States Patent [19]

Murphy

[11] Patent Number: 5,085,390

[45] Date of Patent: Feb. 4, 1992

[54] CONTAINER HOLDER

[76] Inventor: Kevin M. Murphy, 627 Longfellow Ave., Hermosa Beach, Calif. 90254

[21] Appl. No.: 663,689

[22] Filed: Mar. 4, 1991

[51] Int. Cl.⁵ ............................................. A47K 1/08
[52] U.S. Cl. .............................. 248/311.2; 248/205.5; 248/285
[58] Field of Search .................... 248/311–312, 248/313, 314, 315, 310, 309.1, 285, 298, 205.5; 220/85 H, 903; 224/42.45 R

[56] References Cited

U.S. PATENT DOCUMENTS

| | | | |
|---|---|---|---|
| 2,286,012 | 6/1942 | Rochow | 248/311.2 X |
| 3,020,017 | 2/1962 | Watson | 248/205.8 |
| 4,043,531 | 8/1977 | Green | 248/205.8 X |
| 4,271,878 | 6/1981 | Bologa | 248/146 X |
| 4,474,354 | 10/1984 | Field | 248/311.2 X |
| 4,535,923 | 8/1985 | Manke | 224/424.5 R X |
| 4,819,843 | 4/1989 | Nakayama | 248/311.2 X |
| 4,957,254 | 9/1990 | Hill et al. | 248/311.2 X |
| 4,997,156 | 3/1991 | Allen | 248/311.2 |
| 5,004,203 | 4/1991 | Fabius | 248/285 |

Primary Examiner—Ramon O. Ramirez
Attorney, Agent, or Firm—James G. O'Neill

[57] ABSTRACT

A container holding device having a suction cup mounting means with an elongated arm rotatably mounted thereon. A container holder is fixed to the elongated arm at an angle and has a base and a sidewall for supporting a container in the container holder in the upright position. For supporting different size containers, the holding device includes a second elongated arm rotatably mounted on the first arm. The second arm is actuated by an actuating means held between the arms, against the action of a biasing means, and includes a removable lid rotatably mounted on the end of the second arm capable of coacting with the top of a container held in the container holding device.

20 Claims, 2 Drawing Sheets

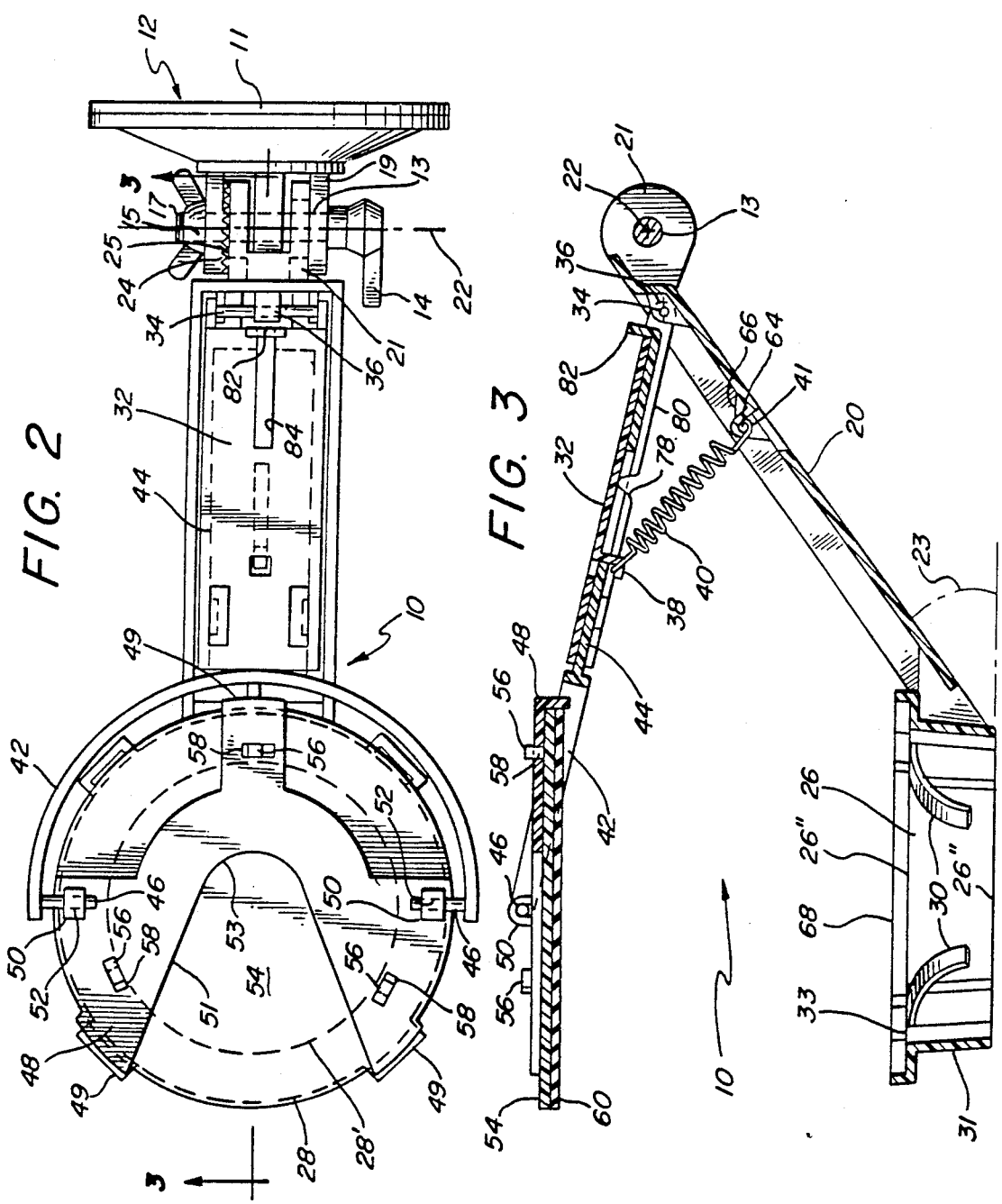

CONTAINER HOLDER

BACKGROUND OF THE INVENTION

1. Field of the Invention

This invention relates generally to container holders, and more particularly to an articulating container holder for use in a vehicle.

2. Description of Related Art

Holders for various containers are known for use in vehicles or other areas. They may be hooked onto various elements, or attached to a smooth surface in a desired position to enable the item held within the holder to be conveniently available for use.

One such prior art holder is shown in U.S. Pat. No. 4,819,843, which discloses a drink holder for attachment to the side door, or other interior panel of a vehicle adjacent a side window, by a mounting means. The mounting means has a retaining piece inserted between the window and its frame and another supporting piece which rests against the interior door or similar panel in the vehicle to support the drink holder in position. However, this device is limited in where it may be placed in a vehicle because the mounting means may only be placed adjacent a side window.

In U.S. Pat. No. 2,254,848 there is disclosed a receptacle stand for a garbage can which includes a supporting base and a foot actuated lid for opening and closing a garbage can supported on the base, and for retaining the can in place.

U.S. Pat. No. 2,286,012 discloses an implement holder having a supporting base, a back and a suction cup mounted on the back to fix the holder to a kitchen wall.

U.S. Pat. No. 2,532,244 discloses a can holder and perforator having a base on which a can is supported, a pair of can engaging clips for gripping a can, a handle for carrying the holder and a rotating metal cover having a number of can piercing elements fixed to the cover.

U.S. Pat. No. 3,020,017 discloses a medical placement device having suction cups located therein for holding various implements at different angles and varying positions. The suction cups are operated by a lever which actuates and releases them.

U.S. Pat. No. 3,051,428 discloses a self-leveling holding device for paint cans which is clamped to a ladder by a clamping portion formed integrally with the holding portion. The holding portion is comprised of a plurality of rings which pivot with respect to each other, and includes wickets which are fixed to the inner ring to form a "basket" to support a can of paint. The movement of the rings with respect to each other to maintain the "basket" in the upright position. An auxiliary adapter is provided for insertion into the "basket" to support smaller cans of paint.

U.S. Pat. Nos. 3,082,082, 4,043,531 and 4,133,575 disclose furthur suction cup holding means.

U.S. Pat. No. 4,823,975 discloses a cylindrical can closure with a base, a back attached to the base and a can cover plate moveable with respect to the base and back to press down against a can held between the base and the cover plate. The cover plate has a resilient foam material attached to it to form a seal with the raised lip of the can in the closure.

While the foregoing described prior art structures provide some limited improvements in the container holding manufacturing art, there remains the need in the art for a container holder that may be used in a vehicle or other area in almost any convenient position by fixing the holder against a smooth, clean surface, such as a windshield. Furthermore, there exists the need for a holder which may be articulatly moved after it has been fixed in place, and which may be used with various size containers to secure each size container to prevent dislodgement and/or spilling of any liquid contained therein.

SUMMARY OF THE INVENTION

Accordingly, it is a general object of the present invention to provide an improved holding means for containers. It is a particular object of the present invention to provide an articulating holder having a suction cup holding means moveably affixed thereto for mounting the holder on any smooth surface within a vehicle or other area. It is a still more particular object of the present invention to provide a container holder which may be used to hold various size containers without requiring any adapters for the containers or modifications to the holder.

In accordance with one aspect of the present invention, there is provided an elongated arm held by and rotatable with respect to holding means which includes a suction cup for mounting the container holder on a smooth surface in a vehicle. The elongated arm supports a holding base for a container. Additionally, the present invention comtemplates the use of a second articulated arm supporting a lid means biased toward the arm holding the base by spring means mounted between the arms. An adjusting means is mounted between the arms and coacts with the arms to allow the arms to be spread apart and held in an open position against the tension of the spring, for insertion of a container therein. Upon release of the adjusting means, the arms are biased toward each other, whereby the lid may coact with any container supported in the holding base.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 2 is a top view of the holder of FIG. 1; and

FIG. 3 is a sectional view taken along line 3—3 of FIG. 2.

DESCRIPTION OF THE PREFERRED EMBODIMENTS

Figure 1:
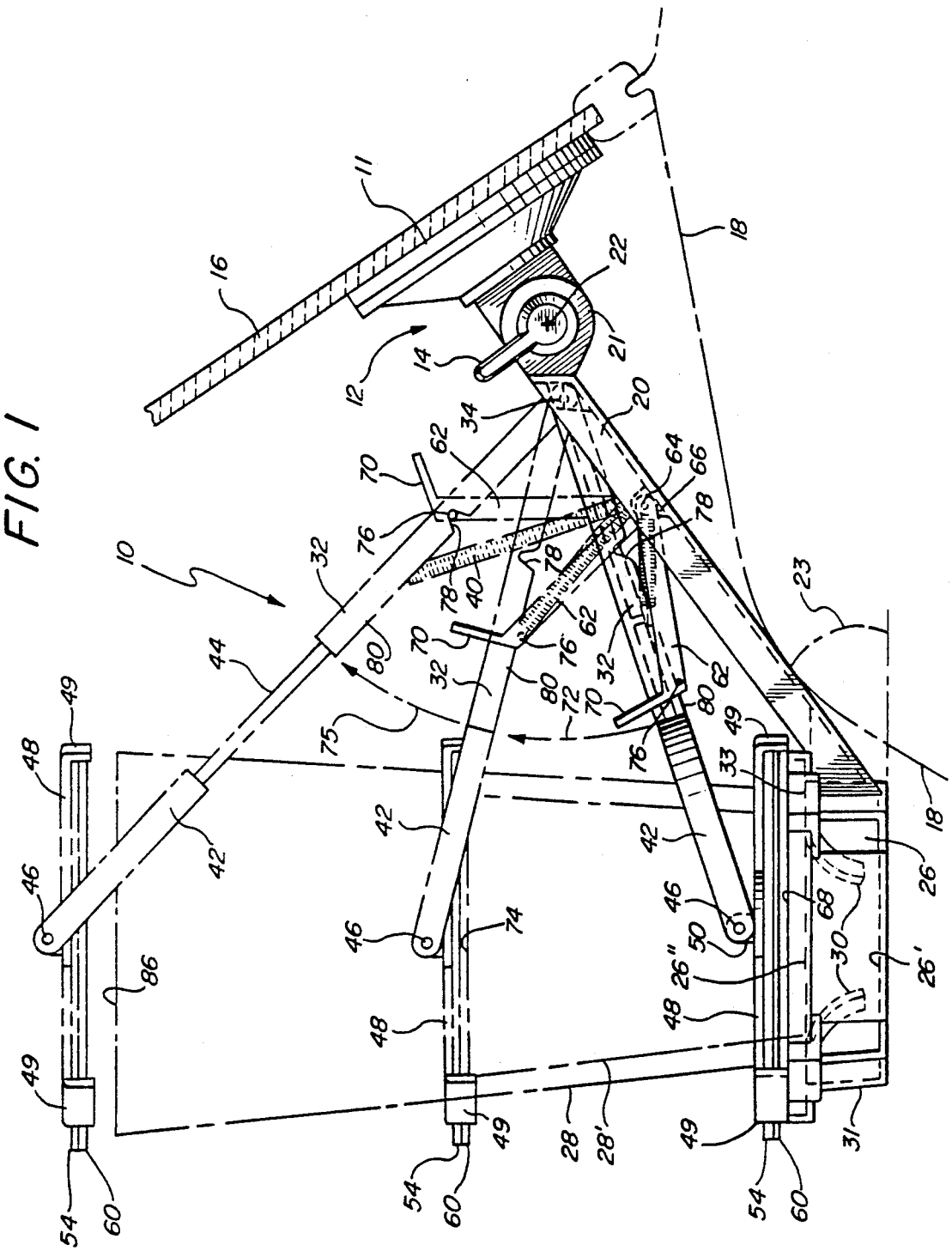
FIG. 1 is a side elevational view of the holder of one embodiment of the present invention shown in various positions.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a description of an improved articulating container holding device designated generally by numeral 10. The holder 10 may be made from any readily available material, such as plastic or metal, but is shown as preferably being manufactured, in the best mode possible, from a high strength plastic to provide sufficient rigidity, while at the same time being light in weight.

The holder 10 includes a mounting means 12, which in the preferred embodiment is shown as including a suction cup 11, operated by means of a pin 13 and a lever 14. With the lever 14 in the open position, the suction cup 11 is moistened and pressed against a clean, flat (smooth) surface, such as the interior of a vehicle windshield 16. The lever 14 is then rotated to the closed position to operate the pin 13 and an internal mechanism of the suction cup, in a known manner, to lock the suction cup 11 and, therefore, the holder to the windshield 16. The suction cup 11 is preferably locked in a position on the interior of the vehicle windshield adjacent the upper surface of a dashboard 18. In this position, an elongated arm 20 of the holder 10 may be articulated or rotated about an axis 22 passing through lever 14 and pin 13 to enable the arm to be brought into contact with dashboard 18, to provide additional support for holder 10. As is more clearly shown in FIG. 2, when the arm 20 is in the lowered position, resting against the dashboard 18, if desired, it may be firmly locked in this position by a locking means such as a wingnut 15 threaded onto outer end 17 of pin 13. When wingnut 15 is tightened, it forces together spline 24 on yoked end portion 19 of the holding means 12, and a cooperating spline 25 on a yoke 21 fixed to the end of arm 20. This firmly couples the holding means 12 and arm 20 to prevent relative movement therebetween, and to maintain a holding base 26 in the level position, as described more fully below.

Arm 20 includes the holding base 26 into which various size containers, such as cans, cups, or the like may be supported. It is to be understood that the base 26 may take various forms or shapes, and is preferably formed integrally with the arm 20, and at an angle 23 thereto. Although the angle 23 may vary, depending on where the holder 10 is going to be used, it has been found that an angle of from between 35° and 40°, preferably around 36°, works best in most vehicles. This preferred angle 23 allows the suction cup 11 to be fixed in position against almost all vehicle windshields with the arm 20 resting against a dashboard with the base 26 in a level position so as to support a container placed in the level base in an upright manner.

The base 26 includes a sidewall 31 formed therewith so as to support the bases of various size cups or the like when placed therein. Furthermore, it is to be understood that in the simpilist mode of the invention, only the mounting means 10, the arm 20 and holding base 26 are required. In this mode the base 26 is made the desired size, and the sidewall 31 is made higher, up to approximately 2½" away from the lowest internal supporting surface of the cup, so as to form a deeper holding base for firmly support the sides of a container placed therein. Because the side-wall 31 of base 26 extends up 2½", it provides more support to a container held in the base 26, and no further arm, supporting members, lid closures, or the like would be needed.

However, in another embodiment of the invention shown in FIGS. 1-3, various other features of the invention are disclosed. In particular, to securely and safely hold different size containers, the holding base 26 is preferably formed so as to include a low sidewall 31 and a plurality of different diameter, concentric, internal supporting surfaces 26', 26'', etc., up to the maximum number of cup sizes it is desired to support in such a base. It has been found that three different diameter supporting surfaces is sufficient to hold and support various size containers such as 28, 28', shown in broken line in FIG. 1, that a user would most likely attempt to place in the holder 10. Additionally, to insure that smaller paper or styrofoam cups placed in the base 26 may be firmly held therein, a plurality of flexible fingers or leaves 30, preferably 4 in number, are provided, equal distances apart, about interior lip 33 of surface 26''. These fingers may be formed from any flexible material such as thin metal, or may be formed integrally with and from the same material as the base.

When a smaller cup, such as 28' is inserted into base 26 and supported on bottom surface 26', the flexible fingers 30 press against the sides of the cup and securely hold the cup in the upright position in the level base 26.

To both more firmly grasp larger cups, such as 28, and to provide security against the spilling of liquids in any cup, if open, a further aspect of the invention provides a second or upper elongated arm 32, articulately mounted with respect to the first or lower arm 20. In the preferred embodiment of the invention shown in the drawings, upper arm 32 is mounted on a hinge pin 34, rotatably captured within a shoulder or other holding means 36 formed integrally with the top surface of lower arm 20. Upper arm 32 is preferably rotatably fixed to the holding means 36 adjacent to the rotation point of arm 20 around axis 22. Upper arm 32 is also preferably formed from a lightweight, high strength, plastic material and includes a finger or tab 38 formed integrally on its lower surface to which is attached one end of a biasing means, such as tension spring 40. Spring 40 is attached at its other end to a finger 41 formed integrally on the upper surface of arm 20 and normally biases upper arm 32 toward arm 20, by rotation of upper arm 32 around hinge pin 34.

Upper arm 32 also includes a substantially semi-circular yoke 42, attached to arm 32, or to a rearwardly extending rectangular element 44, which is inserted in and telescopes within upper arm 32, as more fully explained hereinafter. The yoke 42 includes a pair of inwardly extending diametrically opposed pins 46 having a lid bracket 48 rotatably mounted thereon by means of a pair of shoulders 50 formed on the lid bracket having passages 52 extending therethrough, in which the pins 46 are rotatably held.

The lid bracket 48 removably supports a lid 54 by means such as a bayonet-type fastening or holding means consisting of a plurality of fingers 56, preferably three in number, formed integrally with the top of the lid, which are inserted into and captured in openings 58 formed in lid bracket 48 upon rotation of the lid 54 and fingers 56, in one direction, relative to the lid bracket 48. Upon rotation of the lid and fingers relative to the lid bracket 48 in the reverse direction, the lid may be removed. Or, the lid bracket 48 may have slots formed on the internal surfaces of downwardly extending tabs such as 49. The tabs 49 would also have to be moved or spaced about the lid bracket 49 in such a manner to allow the lid 54 to be slid in and out of the slots formed in the tabs 49.

As shown more clearly in FIG. 2, lid bracket 48 includes a generally V-shaped opening 51 having an arcuate shaped bottom 53. Opening 51 allows the holder 10 of the present invention to be used for containers having an upwardly extending element such as a drink cup with a straw, or a cup or a mug with a cover having a builtin sipping or drinking portion extending upwardly from the top surface. Because such a cup or mug already has a closure or lid, the lid 54 of the present invention may be easily removed, as described above. With lid 54 removed, the upwardly extending element or straw of a cup or mug placed in holding base 26 would pass through opening 51 when the lid bracket 48 is lowered toward such a cup or mug and pressed against the top surface of the respective closure or lid thereof.

Lid 54 may be provided with a resilient layer 60 on the side thereof opposite from fingers 56. Resilient layer 60 may be affixed to the underside of the lid in any known manner, as by adhesive, and is useful in sealing the top of a cup placed in the base 26, as more fully discussed below.

As shown more clearly in FIG. 1, with the arm 20 locked in position against the dashboard 18, with the base 26 level, the upper arm 32, together with the yoke 42 and lid 54 may be rotated relative to the arm 20 and base 26. This rotation is about pin 34, in any desired manner, but preferably by an actuating means such as a lever 62 rotatably carried in any desired manner such as by a pair of hinge pins 64 formed integrally with the lever 62. Hinge pins 64 coact with passages formed in shoulders 66 formed integrally in the upper surface of arm 20, adjacent the lower spring holding finger 41, between holding base 26 and hinge pin 36.

In the first or fully closed position shown in solid line in FIG. 1, lever 62 is in the down position where the tension spring 40 has rotated upper arm 32 and yoke 42 to their lowest positions. The resilient surface 60 of lid 54 is shown resting against top surface 68 of the holding base 26. When a container is to be inserted into base 26, a thumb portion 70 of lever 62 is grasped and pushed upwardly, in the direction of arrows 72 and 75, away from arm 20 and level holding base 26. Upon upward movement of the lever 62, riser pins 76, formed integrally therewith, press against a lower surface 80 of upper arm 32, to move arm 32 a sufficient distance to allow a container, such as a large based mug to be placed in base 26 and supported on lip 33, or the cup 28' to be inserted into and rest against surface 26'. The thumb portion 70 is then released, whereby the tension spring 40 biases the upper arm 32 and yoke 42 back toward arm 20 and base 26, or the reverse direction of that shown by the arrows 72 and 75. The upper arm 32 and yoke 42 will travel until the lower resilient surface 60 of lid 54 is brought into sealing contact with top surface 74 of cup 28', as shown in broken line in the middle or second position of FIG. 1.

If a larger cup 28 is to be inserted and held in holding base 28, thumb element 70 is pushed further in the direction of arrows 72 and 75, causing riser pins 76 to move arm 32 and yoke 42 up a distance which is sufficient for the cup 28 or any other size cup to be inserted in base 26, with its bottom resting against one of the surfaces, such as 26', as shown in FIG. 1. The thumb element 70 is then released to allow the tension spring 40 to bias the upper arm 32 and yoke 42 downwardly until the lower resilient surface 60 of lid 54 is brought into sealing contact with upper lip 86 of cup 28. If a container is to be inserted into or taken from the holder 10 by the use of only one hand, for example, by the driver of a vehicle when stopped at a red light, the lever 62 is pushed upwardly until the riser pins 76 ride into and are held in knotches 78 formed along the edge of lower surface 80 of upper arm 32. This will allow the driver or other user of the holder 10 to see that there is sufficient clearance for a container in the holder to be removed, or for certain size containers to be inserted into holding base 26.

However, as best shown in FIG. 1, to allow a large cup such as 28 to be inserted in and held between the base and the lower resilient surface 60 of lid 54, the user must first move the telescoping section 44 outwardly, away from hinge pin 34, by means of a slider 82, formed integrally with section 44. The slider 82 slides in slot 84 to move yoke 42 and lid 54 outwardly to a third position shown in broken line in FIG. 1. In this third position, the resilient lower surface 60 of lid 54 is held above top lip 86 of cup 28, but lever 62 must then be lowered so that the resilient surface 60 will be sealingly held against the top lip 86 to prevent the loss of any liquid therein, should cup 28 be opened. It should also be noted that with the riser pins 76 captured in the knotches 78, without a container held in or supported in base 26, the upper arm 32 will stay locked in the raised or open position, until the actuating lever 62 is again operated.

It, therefore, can be seen that the present invention provides a novel container holder which is simple to mount in a vehicle and which may be quickly and easily used by almost anyone, including a child, to place a container in or take a container out of the level base 26. Additionally, the present invention provides a novel lid member which may be rotated to and, if needed, telescoped to coact with the top of various size containers held in the base, and to both firmly hold such containers in the base, and prevent liquids from spilling from an open container against which the lid is sealingly biased.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A container holding device comprising in combination:
    a mounting means having a suction cup holding means operated by a lever actuator for fixing said holding devices to a smooth surface;
    a first elongated arm rotatably attached to said mounting means;
    a container holder having a sidewall and a plurality of supporting surfaces fixedly attached to said elongated arm at an angle thereto for supporting different size containers on said supporting surfaces;
    a second elongated arm rotatable with respect to said mounting means and said first arm;
    biasing means held between said first and second arms for biasing said arms together; and
    lid means rotatably carried in said second arm for engagement with a container supported in said container holder by action of said biasing means.

2. The container holding device of claim 1 wherein said container holder includes a plurality of resilient fingers held therein for resiliently holding a container placed in said container holder against the resilience of said fingers.

3. The container holding device of claim 2 wherein said second elongated arm includes a thumb gripping element for operation thereof and a pair of riser pins cooperating with said second elongated arm for moving said second elongated arm upon movement of said thumb gripping element.

4. The container holding device of claim 3 wherein said second elongated arm includes a yoke, slideably mounted within said second elongated arm; said yoke having a lid holding bracket rotatably mounted therein; and a lid having two surfaces with a resilient layer fixed to one of said surfaces removably held in said lid holding bracket, with said resilient layer facing said container holder.

5. The container holding device of claim 4 wherein said yoke includes a rectangular element having a slider fixedly attached thereto slideably held in said second elongated arm in a slot formed therein, whereby said rectangular element and said yoke may be telescoped out of and back into said second elongated arm for use with different size containers supported in said container holder.

6. The container holding device of claim 1 wherein said second arm is rotatably mounted on said first arm, adjacent said mounting means.

7. The container holding device of claim 1 wherein said biasing means is a tension spring, and said second arm is rotated by an actuating means against the action of said spring.

8. The container holding device of claim 7 wherein said actuating means is rotatably carried on said first arm and includes a pair of riser pins which cooperate with said second arm to rotate said second arm with respect to said first arm.

9. The container holding device of claim 8 wherein said lid means includes a resilient layer on one surface thereof, whereby when said resilient layer engages a container, said lid will press said resilient layer into and sealingly engage the upper surface of a container held in said container holding device.

10. The container holding device of claim 9 wherein said lid means comprises a lid bracket and a lid having two sides removably held in said lid bracket; said resilient layer is fixed to said lid on said side away from said lid bracket; and said lid bracket is rotatably carried in a yoke held by said second arm and includes an opening formed therein through which an upwardly extending element of a container held in said device may extend if said lid is removed from said lid bracket.

11. The container holding device of claim 10 wherein said yoke is fixed to a separate element having a slider mounted thereon, and said slider is slidably held in said second arm to allow said yoke to be telescoped out from and back into said second arm by action of said slider.

12. The container holding device of claim 11 wherein said second arm includes a plurality of knotches formed therein; said knotches cooperating with said riser pins formed on said actuating means to hold said riser pins in said knotches to thereby hold said actuating means in place with said second arm in the raised position, away from said first arm.

13. The container holding device of claim 12 wherein said lever actuator for said suction cup holding means includes a locking means which cooperates with further locking means formed in said holding means and said first elongated arm for locking said first elongated arm to said mounting means to thereby prevent further rotation of said first arm.

14. The container holding device of claim 13 wherein the angle between said first elongated arm and said container holder is between 35° and 40°.

15. The container holding device of claim 14 wherein the angle between said first elongated arm and said container holder is 36°.

16. A container holding device comprising in combination:
 a suction cup holding means operated by a lever actuator for releasably mounting said holding device on the interior surface of a vehicle windshield, adjacent the dashboard thereof;
 a first elongated arm rotatably attached to said mounting means;
 a container holding base fixedly attached to said first elongated arm at an angle thereto; said container holding base including a sidewall and a plurality of container supporting surfaces formed therein;
 a second elongated arm rotatably attached to said first elongated arm;
 a biasing means mounted between said first and second elongated arms for normally biasing said second elongated arm toward said first elongated arm;
 a lid holding means formed on said second elongated arm;
 a lid rotatably mounted in said lid holding means; and
 an actuating means rotatably mounted on said first elongated arm and cooperating with said second elongated arm for rotating said second elongated arm with respect to said first elongated arm.

17. The container holding device of claim 16 wherein said container holding base includes a plurality of resilient fingers held therein for resiliently holding a container placed in said base against the resilience of said fingers.

18. The container holding device of claim 17 wherein said actuating means includes a thumb gripping element for operation thereof and a pair of riser pins cooperating with said second elongated arm for moving said second elongated arm upon movement of said thumb gripping element.

19. The container holding device of claim 18 wherein said second elongated arm includes a yoke, slideably mounted within said second elongated arm; said yoke having a lid holding bracket rotatably mounted therein; and a lid having two surfaces with a resilient layer fixed to one of said surfaces removably held in said lid holding bracket, with said resilient layer facing said container holding base.

20. The container holding device of claim 19 wherein said yoke includes a rectangular element having a slider fixedly attached thereto slideably held in said second elongated arm in a slot formed therein, whereby said rectangular element and said yoke may be telescoped out of and back into said second elongated arm for use with different size containers supported in said container holding base.

* * * * *